Jan. 11, 1927.
H. P. KRAFT
1,614,307
TIRE INFLATING COUPLING AND GAUGE
Filed Sept. 22, 1921
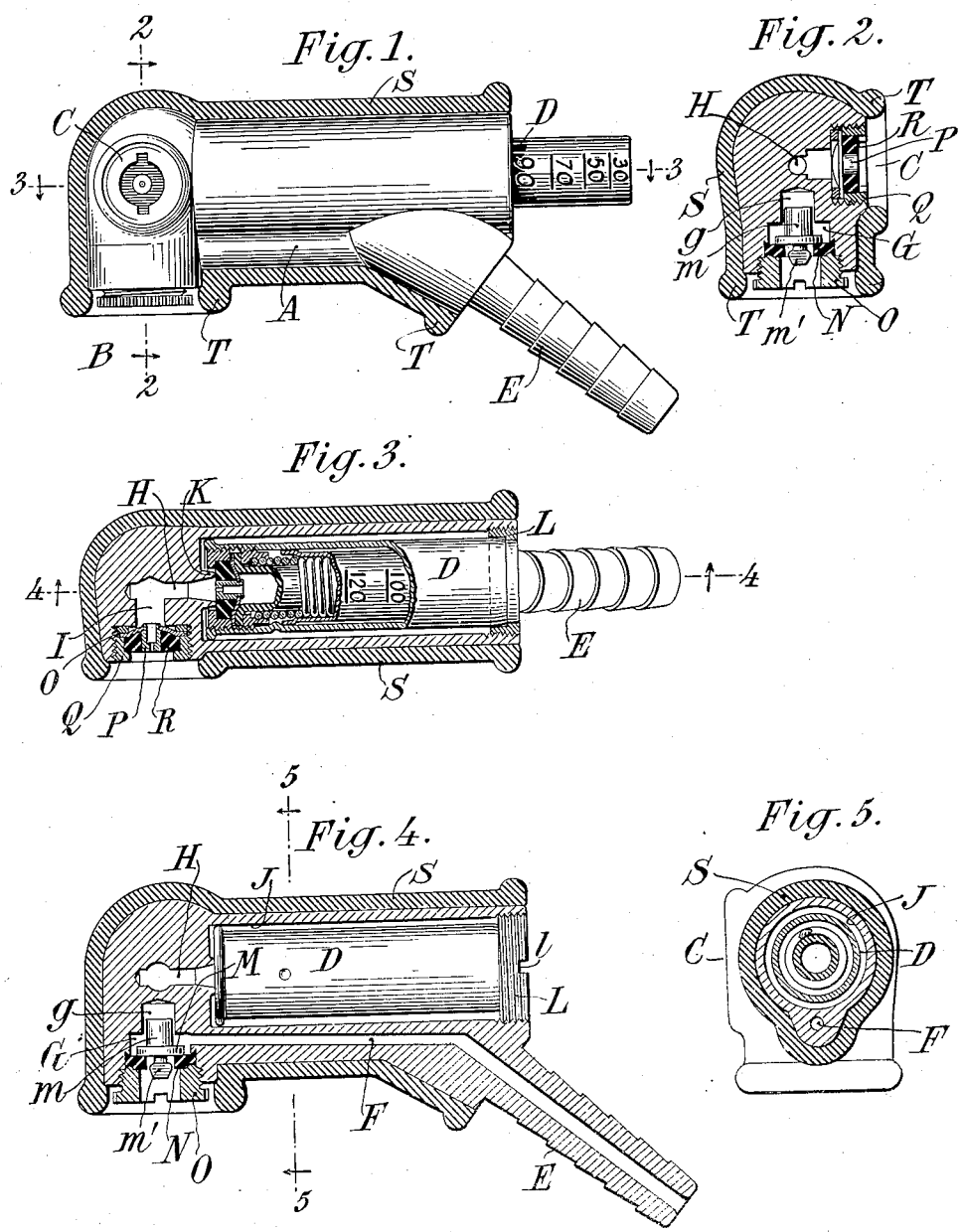
Inventor
Henry Phillip Kraft,
By Attorney
Fraser, Surk & Myers Patented Jan. 11, 1927.

1,614,307

UNITED STATES PATENT OFFICE.

HENRY PHILLIP KRAFT, OF RIDGEWOOD, NEW JERSEY; EDGAR J. PHILLIPS AND EARL A. DARR EXECUTORS OF SAID HENRY P. KRAFT, DECEASED.

TIRE-INFLATING COUPLING AND GAUGE.

Application filed September 22, 1921. Serial No. 502,465.

The present invention relates to a tire inflating coupling and gauge and aims to provide certain improvements therein.

In devices of this class heretofore proposed the pressure gauge was at all times subjected to the pump pressure during the process of inflating the tire. This action action owing to the pulsations of the pump soon affected the gauge so that it would not register accurately. Also in other devices of this class it has been proposed to provide a separate press-on foot for the gauge to overcome the detrimental action upon the gauge before mentioned. To accomplish this a tire inflating coupling and a separate pressure gauge formed with an annular press-on foot are connected together, the two instruments being held in an assembled relationship by various mechanical contrivances. This latter form of device has also proved objectionable because the parts would in time become injured, damaged or separated owing to the rough and careless usage to which the device is subjected by being repeatedly thrown onto the concrete floor of the garage or the pavement after the operator is through with it.

According to the present invention the above mentioned objections to a device of this class are overcome. By the present invention there is provided a combined tire inflating coupling and pressure gauge having a separate press-on foot for the gauge and a separate tire valve engaging means for inflating the tire. The tire valve engaging means and the press-on foot are preferably so positioned on the body portion of the device so that a quick shifting from one to the other may be readily made during the process of inflating and gauging the tire. The danger of injury by rough usage is overcome by having the press-on foot, tire valve engaging means and the gauge proper all enclosed substantially within the contour of the body portion, and said parts are further protected by enclosing the body portion in a rubber cushioning jacket. Certain other features of improvements are provided which will be hereinafter more fully described.

Referring to the drawings:

Figure 1 is an elevation of the device showing the rubber jacket in section;

Fig. 2 is a transverse section taken on the line 2—2 of Fig. 1;

Fig. 3 is a longitudinal section taken on the line 3—3 of Fig. 1;

Fig. 4 is a longitudinal section taken on the line 4—4 of Fig. 3 the pressure gauge being shown in elevation;

Fig. 5 is a transverse section taken on the line 5—5 of Fig. 4.

Referring to the drawings, let A indicate the body portion of the device which has associated therewith the tire valve engaging means B, press-on foot C, a pressure gauge D, and a shank E adapted to receive thereon a hose connecting with the source of fluid pressure.

The body portion A, which may be of any desired construction, is preferably made substantially as indicated in the drawings and is provided with a duct F adapted to establish communication between the source of fluid pressure and the valve chamber G, formed above the tire valve engaging means B, and a second duct H establishing communication between the chamber I formed above the press-on foot C and an enlarged cylindrical recess J adapted to accommodate and entirely enclose the pressure gauge D. While any type of pressure gauge may be used in the combination disclosed it is preferable to use a gauge of the press-on type completely assembled before insertion into the recess in the body portion. Such a gauge, known as the "Schrader Universal" gauge, is shown as employed herein. This gauge may be either of the temporary indicating variety or of the stay-up type, the latter type being preferably employed in devices adapted for use in the night time whereby the device may be employed to engage a tire valve to gauge the pressure therein and taken to a point remote from the tire to read the pressure indicated by the gauge. As this type of gauge is well known a detailed description thereof need not be given herein. However, as it is essential that a leaktight joint be provided between the press-on foot of the gauge and the body portion to which it is connected means are provided whereby such connection is obtained.

These means consist of a raised circular ridge K formed at the base of the enlarged recess J and projecting into said recess and encircling the duct H, and the screw-threaded bushing sleeve L threaded into the open end of the recess J and contacting with the casing of the gauge to hold the press-on packing gasket in engagement with the seat K. The bushing L is preferably formed with kerfs *l* adapted to receive a screwdriver whereby it may be easily positioned in or removed from the body portion, thus permitting the gauge to be bodily removed from said body portion.

The tire valve engaging means B, which serves as an inflating chuck, may be of any approved construction, and as herein shown consists of a disk-like valve M provided at its upper side with a guide shank *m* movable in a recess *g* formed in the valve chamber G and on its underside with a tire valve unseating means *m'*. The valve M owing to the pump pressure flowing into the chamber G normally remains seated upon a packing washer N which is held in position within the body portion by a screw threaded bushing O.

The press-on foot C likewise may be of any approved construction and as herein disclosed comprises a valve unseating pin P having an opening therein through which air may enter the chamber I leading to the gauge, said pin being supported within the body portion by being mounted on the washer O which is held in place by a bushing Q. The bushing Q also serves to hold a packing washer R in place, said packing washer being adapted to make a tight joint with the tire valve.

For the efficient operation and compact construction of the device I prefer to arrange the tire valve engaging means B and the press-on foot C adjacent one end of the body portion and approximately 90° apart so that when it is sought to gauge the tire pressure after inflating the tire, or vice versa, the mere lifting off and a slight turning of the device will be necessary. It is also preferable to have the axes of the tire valve engaging means and the press-on foot in the same plane so that no longitudinal movement of the device will be necessary during the operations mentioned above.

As a device of this class is particularly adapted for use at garages or other service stations, and as the device is permanently attached to a long hose leading from the source of pressure supply and gives rise to careless handling of the device by the user, it is preferable to protect the device by enclosing it in a suitable protective casing. As herein disclosed, a rubber casing S is employed for this purpose. Preferably this casing is designed to completely enclose the body portion of the device, suitable openings being provided for the tire valve engaging means B, and the press-on foot C. At said last named openings and at the end of the jacket surrounding the end of the body portion it is formed with enlarged beads T adapted to take up the shocks and jars when the device is dropped or thrown. This rubber jacket may be applied over the device in any desired manner but it is preferred to secure it permanently thereto.

I have shown and described a preferred embodiment of my invention but it will be understood that I do not wish to be limited thereto as various changes may be made therein without departing from the spirit of the invention.

What I claim is:

A combined coupling and pressure gauge having a body portion comprising a tire valve engaging means, a press-on foot, a hose shank, and enlarged recess, a duct providing communication between said tire valve engaging means and said hose shank, a second duct providing communication between said press-on foot and said enlarged recess, a pressure gauge completely housed within said enlarged recess, said body portion substantially enclosing said various parts to render the device free from protuberances, and said body portion being adapted to serve as an operating handle for the device.

In witness whereof, I have hereunto signed my name.

HENRY PHILLIP KRAFT.